United States Patent
Quintana Romero et al.

(10) Patent No.: US 12,534,766 B2
(45) Date of Patent: Jan. 27, 2026

(54) RAPID DETECTION OF ANTIMICROBIAL RESISTANCE BY MICROBIAL RIBOSOME IMMUNOPRECIPITATION

(71) Applicant: UNIVERSITAT AUTONOMA DE BARCELONA, Bellaterra (ES)

(72) Inventors: Albert Quintana Romero, Bellaterra (ES); Elisenda Sanz Iglesias, Bellaterra (ES)

(73) Assignee: UNIVERSITAT AUTONOMA DE BARCELONA, Bellaterra (ES)

( * ) Notice: Subject to any disclaimer, the term of this patent is extended or adjusted under 35 U.S.C. 154(b) by 1047 days.

(21) Appl. No.: 17/048,320

(22) PCT Filed: Apr. 11, 2019

(86) PCT No.: PCT/EP2019/059252
§ 371 (c)(1),
(2) Date: Oct. 16, 2020

(87) PCT Pub. No.: WO2019/201737
PCT Pub. Date: Oct. 24, 2019

(65) Prior Publication Data
US 2023/0160022 A1    May 25, 2023

(30) Foreign Application Priority Data

Apr. 17, 2018    (EP) ..................... 18382256

(51) Int. Cl.
*C12Q 1/689*    (2018.01)
*C12Q 1/6804*    (2018.01)
*C12Q 1/6851*    (2018.01)

(52) U.S. Cl.
CPC .......... *C12Q 1/689* (2013.01); *C12Q 1/6804* (2013.01); *C12Q 1/6851* (2013.01); *C12Q 2600/158* (2013.01)

(58) Field of Classification Search
CPC ..... C12Q 1/6851; C12Q 1/6804; C12Q 1/689
See application file for complete search history.

(56) References Cited

U.S. PATENT DOCUMENTS

| | | |
|---|---|---|
| 2011/0111399 A1 | 5/2011 | O'Hara et al. |
| 2015/0141274 A1 | 5/2015 | Friedman et al. |
| 2016/0208316 A1* | 7/2016 | Maurin ................ C12Q 1/6806 |

FOREIGN PATENT DOCUMENTS

| | | |
|---|---|---|
| JP | 2017207333 A * | 11/2017 |
| WO | WO-2012126882 A1 | 9/2012 |
| WO | WO-2014072349 A1 | 5/2014 |

OTHER PUBLICATIONS

Heiman et al ,2014, Cell type-specific mRNA purification by translating ribosome affinity purification (TRAP), Nat Protocols, 9(6): 2014, 1282-1291 (Year: 2014).*
International Search Report and Written Opinion of the International Searching Authority, issued in PCT/EP2019/059252 mailed May 31, 2019; ISA/EP.
Bursle, E. & Robson, "Non-culture methods for detecting infection" J. Aust Prescr 39, 171-175, (2016).
Bosshard, P.P., Abels, S., Zbinden, R., Bottger, E.C. & Altwegg, M. "Ribosomal DNA Sequencing for Identification of Aerobic Gram-Positive Rods in the Clinical Laboratory (an 18-Month Evaluation)" J. Clin. Microbial. 41, 4134-4140, (2003).
Rampini, S.K. et al. "Broad-range 16S rRNA gene polymerase chain reaction for diagnosis of culture •negative bacterial infections" Clin. Infect. Dis. 53, 1245-1251, (2011).
Otto, M., "Next-generation sequencing to monitor the spread of antimicrobial resistance", Genome Med. 9, 68, (2017).
Cangelosi, G.A. & Meschke, J.S. "Dead or Alive: Molecular Assessment of Microbial Viability" Appl. Environ. Microbial. 80, 5884-5891, (2014).
Milner, M.G., Saunders, J.R. & McCarthy, A.J. "Relationship between nucleic acid ratios and growth in Listeria monocytogenes" Microbiology 147, 2689-2696, (2001).

* cited by examiner

*Primary Examiner* — Gary Benzion
*Assistant Examiner* — Lisa Horth
(74) *Attorney, Agent, or Firm* — Harness, Dickey & Pierce, P.L.C.

(57) ABSTRACT

The present invention provides a method for determining the resistance of a microorganism to a drug by detecting at least a transcript of a drug resistance gene from a microorganism in a biological sample, the method comprising the steps of: (i) lysing the cells by means of a chemical or a mechanical method, thereby obtaining a lysate and cell debris; (ii) obtaining a ribosome-antibody complex from the lysate using an antibody or a fragment thereof which binds specifically to a microorganism-ribosomal protein; (iii) purifying the mRNA associated to the ribosome-antibody complex by means of a nucleic acid extraction method; and (iv) submitting the resulting mRNA to a specific gene detection method, thereby identifying the at least one drug resistance gene transcript of the biological sample. Provided methods and kits allow determining the resistance to antibiotics of a biological sample in a rapid and reliable manner, thereby minimizing the risk of AMR and allowing the definition of the therapeutic potential of a selected antibiotic

14 Claims, 3 Drawing Sheets
Specification includes a Sequence Listing.

SEQUENCE LISTING

```
<160> NUMBER OF SEQ ID NOS: 13

<210> SEQ ID NO 1
<211> LENGTH: 9
<212> TYPE: PRT
<213> ORGANISM: Artificial Sequence
<220> FEATURE:
<223> OTHER INFORMATION: Bacteria <prokaryote>
<220> FEATURE:
<221> NAME/KEY: VARIANT
<222> LOCATION: (2)..(2)
<223> OTHER INFORMATION: Non-conserved amino acid
<220> FEATURE:
<221> NAME/KEY: VARIANT
<222> LOCATION: (4)..(4)
<223> OTHER INFORMATION: Non-conserved amino acid
<220> FEATURE:
<221> NAME/KEY: VARIANT
<222> LOCATION: (8)..(8)
<223> OTHER INFORMATION: Non-conserved amino acid

<400> SEQUENCE: 1

Gly Xaa Arg Xaa Leu Ala Tyr Xaa Ile
1               5

<210> SEQ ID NO 2
<211> LENGTH: 24
<212> TYPE: PRT
<213> ORGANISM: Artificial Sequence
<220> FEATURE:
<223> OTHER INFORMATION: Bacteria <prokaryote>
<220> FEATURE:
<221> NAME/KEY: VARIANT
<222> LOCATION: (5)..(5)
<223> OTHER INFORMATION: Non-conserved amino acid
<220> FEATURE:
<221> NAME/KEY: VARIANT
<222> LOCATION: (7)..(7)
<223> OTHER INFORMATION: Non-conserved amino acid
<220> FEATURE:
<221> NAME/KEY: VARIANT
<222> LOCATION: (21)..(21)
<223> OTHER INFORMATION: Non-conserved amino acid
<220> FEATURE:
<221> NAME/KEY: VARIANT
<222> LOCATION: (22)..(22)
<223> OTHER INFORMATION: Non-conserved amino acid

<400> SEQUENCE: 2

Ser Ile Arg Leu Xaa Arg Xaa Lys Lys Arg Pro Phe Arg Ile Val Val
1               5                   10                  15

Ala Asp Ser Arg Xaa Xaa Arg Asp
            20

<210> SEQ ID NO 3
<211> LENGTH: 12
<212> TYPE: PRT
<213> ORGANISM: Artificial Sequence
<220> FEATURE:
<223> OTHER INFORMATION: Bacteria <prokaryote>
<220> FEATURE:
<221> NAME/KEY: VARIANT
<222> LOCATION: (6)..(6)
```

```
<223> OTHER INFORMATION: Non-conserved amino acid
<220> FEATURE:
<221> NAME/KEY: VARIANT
<222> LOCATION: (7)..(7)
<223> OTHER INFORMATION: Non-conserved amino acid
<220> FEATURE:
<221> NAME/KEY: VARIANT
<222> LOCATION: (9)..(9)
<223> OTHER INFORMATION: Non-conserved amino acid

<400> SEQUENCE: 3

Gly Arg Phe Ile Glu Xaa Xaa Gly Xaa Tyr Asn Pro
1               5                   10

<210> SEQ ID NO 4
<211> LENGTH: 12
<212> TYPE: PRT
<213> ORGANISM: Artificial Sequence
<220> FEATURE:
<223> OTHER INFORMATION: Bacteria <prokaryote>
<220> FEATURE:
<221> NAME/KEY: VARIANT
<222> LOCATION: (3)..(3)
<223> OTHER INFORMATION: Non-conserved amino acid
<220> FEATURE:
<221> NAME/KEY: VARIANT
<222> LOCATION: (4)..(4)
<223> OTHER INFORMATION: Non-conserved amino acid
<220> FEATURE:
<221> NAME/KEY: VARIANT
<222> LOCATION: (11)..(11)
<223> OTHER INFORMATION: Non-conserved amino acid

<400> SEQUENCE: 4

Trp Leu Xaa Xaa Gly Ala Gln Pro Ser Asp Xaa Val
1               5                   10

<210> SEQ ID NO 5
<211> LENGTH: 45
<212> TYPE: PRT
<213> ORGANISM: Artificial Sequence
<220> FEATURE:
<223> OTHER INFORMATION: Bacteria <prokaryote>
<220> FEATURE:
<221> NAME/KEY: VARIANT
<222> LOCATION: (3)..(3)
<223> OTHER INFORMATION: Non-conserved amino acid
<220> FEATURE:
<221> NAME/KEY: VARIANT
<222> LOCATION: (4)..(4)
<223> OTHER INFORMATION: Non-conserved amino acid
<220> FEATURE:
<221> NAME/KEY: VARIANT
<222> LOCATION: (5)..(5)
<223> OTHER INFORMATION: Non-conserved amino acid
<220> FEATURE:
<221> NAME/KEY: VARIANT
<222> LOCATION: (8)..(8)
<223> OTHER INFORMATION: Non-conserved amino acid
<220> FEATURE:
<221> NAME/KEY: VARIANT
<222> LOCATION: (11)..(11)
<223> OTHER INFORMATION: Non-conserved amino acid
<220> FEATURE:
<221> NAME/KEY: VARIANT
<222> LOCATION: (17)..(17)
<223> OTHER INFORMATION: Non-conserved amino acid
<220> FEATURE:
<221> NAME/KEY: VARIANT
<222> LOCATION: (25)..(25)
<223> OTHER INFORMATION: Non-conserved amino acid
<220> FEATURE:
<221> NAME/KEY: VARIANT
<222> LOCATION: (28)..(28)
<223> OTHER INFORMATION: Non-conserved amino acid
```

```
<220> FEATURE:
<221> NAME/KEY: VARIANT
<222> LOCATION: (31)..(31)
<223> OTHER INFORMATION: Non-conserved amino acid
<220> FEATURE:
<221> NAME/KEY: VARIANT
<222> LOCATION: (34)..(34)
<223> OTHER INFORMATION: Non-conserved amino acid
<220> FEATURE:
<221> NAME/KEY: VARIANT
<222> LOCATION: (41)..(41)
<223> OTHER INFORMATION: Non-conserved amino acid

<400> SEQUENCE: 5

Lys Asp Xaa Xaa Xaa Leu Lys Xaa Phe Ile Xaa Glu Arg Gly Lys Ile
1               5                   10                  15

Xaa Pro Arg Arg Ile Thr Gly Thr Xaa Ala Lys Xaa Gln Arg Xaa Leu
            20                  25                  30

Ala Xaa Ala Ile Lys Arg Ala Arg Xaa Leu Ala Leu Leu
        35                  40                  45

<210> SEQ ID NO 6
<211> LENGTH: 31
<212> TYPE: PRT
<213> ORGANISM: Artificial Sequence
<220> FEATURE:
<223> OTHER INFORMATION: Bacteria <prokaryote>
<220> FEATURE:
<221> NAME/KEY: VARIANT
<222> LOCATION: (2)..(2)
<223> OTHER INFORMATION: Non-conserved amino acid
<220> FEATURE:
<221> NAME/KEY: VARIANT
<222> LOCATION: (6)..(6)
<223> OTHER INFORMATION: Non-conserved amino acid
<220> FEATURE:
<221> NAME/KEY: VARIANT
<222> LOCATION: (9)..(9)
<223> OTHER INFORMATION: Non-conserved amino acid
<220> FEATURE:
<221> NAME/KEY: VARIANT
<222> LOCATION: (10)..(10)
<223> OTHER INFORMATION: Non-conserved amino acid
<220> FEATURE:
<221> NAME/KEY: VARIANT
<222> LOCATION: (11)..(11)
<223> OTHER INFORMATION: Non-conserved amino acid
<220> FEATURE:
<221> NAME/KEY: VARIANT
<222> LOCATION: (12)..(12)
<223> OTHER INFORMATION: Non-conserved amino acid
<220> FEATURE:
<221> NAME/KEY: VARIANT
<222> LOCATION: (15)..(15)
<223> OTHER INFORMATION: Non-conserved amino acid
<220> FEATURE:
<221> NAME/KEY: VARIANT
<222> LOCATION: (17)..(17)
<223> OTHER INFORMATION: Non-conserved amino acid
<220> FEATURE:
<221> NAME/KEY: VARIANT
<222> LOCATION: (18)..(18)
<223> OTHER INFORMATION: Non-conserved amino acid
<220> FEATURE:
<221> NAME/KEY: VARIANT
<222> LOCATION: (20)..(20)
<223> OTHER INFORMATION: Non-conserved amino acid
<220> FEATURE:
<221> NAME/KEY: VARIANT
<222> LOCATION: (21)..(21)
<223> OTHER INFORMATION: Non-conserved amino acid
<220> FEATURE:
<221> NAME/KEY: VARIANT
<222> LOCATION: (22)..(22)
<223> OTHER INFORMATION: Non-conserved amino acid
```

-continued

```
<220> FEATURE:
<221> NAME/KEY: VARIANT
<222> LOCATION: (23)..(23)
<223> OTHER INFORMATION: Non-conserved amino acid
<220> FEATURE:
<221> NAME/KEY: VARIANT
<222> LOCATION: (25)..(25)
<223> OTHER INFORMATION: Non-conserved amino acid
<220> FEATURE:
<221> NAME/KEY: VARIANT
<222> LOCATION: (26)..(26)
<223> OTHER INFORMATION: Non-conserved amino acid

<400> SEQUENCE: 6

Asn Xaa Lys Ser Ala Xaa Lys Arg Xaa Xaa Xaa Xaa Glu Lys Xaa Arg
1               5                   10                  15

Xaa Xaa Asn Xaa Xaa Xaa Xaa Ser Xaa Xaa Arg Thr Phe Ile Lys
            20                  25                  30

<210> SEQ ID NO 7
<211> LENGTH: 16
<212> TYPE: PRT
<213> ORGANISM: Artificial Sequence
<220> FEATURE:
<223> OTHER INFORMATION: Bacteria <prokaryote>
<220> FEATURE:
<221> NAME/KEY: VARIANT
<222> LOCATION: (3)..(3)
<223> OTHER INFORMATION: Non-conserved amino acid
<220> FEATURE:
<221> NAME/KEY: VARIANT
<222> LOCATION: (12)..(12)
<223> OTHER INFORMATION: Non-conserved amino acid

<400> SEQUENCE: 7

Lys Gly Xaa Ile His Lys Asn Lys Ala Ala Arg Xaa Lys Ser Arg Leu
1               5                   10                  15

<210> SEQ ID NO 8
<211> LENGTH: 20
<212> TYPE: DNA
<213> ORGANISM: Artificial Sequence
<220> FEATURE:
<223> OTHER INFORMATION: Escherichia coli - Kanamycin FORWARD

<400> SEQUENCE: 8
tgcctgcttg ccgaatatca                                           20

<210> SEQ ID NO 9
<211> LENGTH: 20
<212> TYPE: DNA
<213> ORGANISM: Artificial Sequence
<220> FEATURE:
<223> OTHER INFORMATION: Escherichia coli - Kanamycin REVERSE

<400> SEQUENCE: 9
atatcacggg tagccaacgc                                           20

<210> SEQ ID NO 10
<211> LENGTH: 20
<212> TYPE: DNA
<213> ORGANISM: Artificial Sequence
<220> FEATURE:
<223> OTHER INFORMATION: Escherichia coli - Ampicillin FORWARD

<400> SEQUENCE: 10
agtgataaca ctgcggccaa                                           20
```

```
<210> SEQ ID NO 11
<211> LENGTH: 20
<212> TYPE: DNA
<213> ORGANISM: Artificial Sequence
<220> FEATURE:
<223> OTHER INFORMATION: Escherichia coli - Ampicillin REVERSE

<400> SEQUENCE: 11
ttcattcagc tccggttccc                                              20

<210> SEQ ID NO 12
<211> LENGTH: 20
<212> TYPE: DNA
<213> ORGANISM: Artificial Sequence
<220> FEATURE:
<223> OTHER INFORMATION: Escherichia coli - Neomycin FORWARD

<400> SEQUENCE: 12
tgaatgaact gcaggacgag                                              20

<210> SEQ ID NO 13
<211> LENGTH: 20
<212> TYPE: DNA
<213> ORGANISM: Artificial Sequence
<220> FEATURE:
<223> OTHER INFORMATION: Escherichia coli - Neomycin REVERSE

<400> SEQUENCE: 13
aatagcagcc agtcccttcc                                              20
```

RAPID DETECTION OF ANTIMICROBIAL RESISTANCE BY MICROBIAL RIBOSOME IMMUNOPRECIPITATION

CROSS-REFERENCE TO RELATED APPLICATIONS

This application is a 371 U.S. National Phase of International Application No. PCT/EP2019/059252, filed Apr. 11, 2019, which claims priority to European Patent Application No. 18382256.8, filed Apr. 17, 2018. The entire disclosures of the above applications are incorporated herein by reference.

REFERENCE TO A SEQUENCE LISTING

This application contains references to amino acid sequences and/or nucleic acid sequences which have been submitted concurrently herewith as the sequence listing text file entitled "Sequence Listing.TXT," file size 6,789 bytes, created on Feb. 8, 2021. The aforementioned sequence listing is hereby incorporated by reference in its entirety pursuant to 37 C.F.R. § 1.52(e)(5).

FIELD OF THE INVENTION

The present invention refers to the field of biomedicine and diagnostics, particularly, to methods and kits for determining the resistance to antibiotics of a biological sample in a rapid and reliable manner, thereby minimizing the risk of AMR and allowing the definition of the therapeutic potential of a selected antibiotic.

BACKGROUND ART

The advent of antibiotics represented a worldwide social and medical revolution. Since the discovery of penicillin, in 1928, previously deadly infections have become nothing more than minor ailments. However, the misuse and abuse of antimicrobial drugs have led to a selection of pathogenic bacterial strains presenting antimicrobial resistance (AMR).

AMR has become a worldwide epidemic, with some estimates suggesting that, by 2050, 10 million people per year will die, worldwide, because of bacterial antibiotic resistances. Currently, AMR is responsible for over 23.000 deaths per year in the EU and a similar number in the US, accounting for 700.000 deaths per year globally. Furthermore, AMR is associated with an increase in morbidity, longer hospitalization time (up to 15 days) and a significant increase in the associated medical costs (CDC Core action on AMR). In some cases, the appearance and spread of AMR has led to the appearance of multi-resistant strains (also known as superbugs), some of which are resistant to all or almost all known antibiotics. Together with the low success rate of new antibiotic development, there is the risk to a return to the pre-antibiotic era, which would undoubtedly carry grave consequences.

Hence, several public and governmental agencies such as the World Health Organization (WHO), the Center for Disease Control (CDC) or the European Commission (EC), have focused their efforts on establishing programs to reverse this situation. Among the different directives proposed, one of the top priorities is the optimization of existing, and the development of novel, diagnostic methods.

Unfortunately, current diagnostics rely on bacterial cultures. This system, albeit informative, has several caveats, such as a long turnaround time, which can be up to two weeks for some bacterial strains, low sensitivity and the requirement to have, at least to a certain degree, prior information on the putative causative bacteria (Bursle, E. et al., 2016). These diagnostic delays can lead to administration of wide-spectrum first-defense antibiotics or trial-and-error treatments, which can contribute to AMR development and can lead to a detrimental effect on patient's health.

Recently, new culture-independent, diagnostic systems have been described. Among these, diagnostic tests at the genomic level are gaining traction. In this regard, nucleic acid-based systems have been recently developed. Earlier methods relied on PCR-amplification of 16S ribosomal gene as means of identifying the pathogenic bacteria but not determining their resistance to antibiotics (Bosshard, P. P. et al, 2003 and Rampini, S. K. et al., 2011)

With the advent of Next-Generation Sequencing (NGS), also known as high-throughput sequencing, systems to allow for deep-sequencing of biological samples are being proposed, (Otto, M. 2017 and Cangelosi, G. A. et al. 2014), although they still show little penetrance in the clinic due to the requirement of expensive equipment and highly-specialized personnel. Noteworthy, while allowing for rapid and specific detection of AMR, NGS methods based on DNA and RNA-based detection methods present several limitations. First of all, given the stability of DNA molecules, it is a concern the diagnostic of false positives due to poor ability of these methods at differentiating DNA signal from viable or non-viable cells. Furthermore, DNA levels provide a poor representation of the metabolic or physiological state of the cell (Milner, M. G. et al. 2001), which would hinder close monitoring of the bacterial response to antibiotic treatment. For example, in Cangelosi, G. A. et al, 2014, total DNA and the ability to synthetize a macromolecule in response to a nutritional stimulation are detected, but these two parameters do not necessarily have to be informative from the same causative bacteria.

WO2014/072349A1 and US2015/141274A1 pertain to the field of translatomics, based on immunoprecipitation of ribosome-RNA complexes and subsequent analysis of ribosome-associated RNA species. However none of them discloses or suggests to use the disclosed analytical method for the detection of drug resistance associated microbial nucleic acids.

SUMMARY OF THE INVENTION

The present invention provides methods and kits for determining the resistance to antibiotics of a biological sample in a rapid and reliable manner, thereby minimizing the risk of AMR and allowing the definition of the therapeutic potential of a selected antibiotic. By means of the method of the invention a real-time comprehensive translational profile from cultures of a wide range of genetically defined bacteria is obtained.

Accordingly, a first aspect of the invention relates to a method for determining the resistance of a microorganism to a drug by detecting at least a transcript of a drug resistance gene from a microorganism in a biological sample, the method comprising the steps of:
  (i) submitting the sample to a chemical or a mechanical cell lysis method, thereby obtaining a lysate and cell debris;
  (ii) obtaining a ribosome-antibody complex from the lysate using an antibody or a fragment thereof which binds specifically to a microorganism-ribosomal protein;

(iii) purifying the mRNA associated to the ribosome-antibody complex by means of a nucleic acid extraction method; and (iv) submitting the resulting mRNA to a specific gene detection method, thereby identifying the at least one drug resistance gene transcript of the biological sample.

As understood by the skilled person in the present context, the biological sample may be any sample of biological origin, such as a clinical sample, an environmental, an agricultural, an animal or food sample, suspected of comprising an antibiotic-resistant microorganism.

Another aspect of the invention relates to the use of a kit for detecting at least a transcript of a drug resistance gene from a microorganism in a biological sample, the kit comprising: (i) an antibody or a fragment thereof which binds specifically to a microorganism-ribosomal protein; and (ii) means for isolating the ribosome-antibody complex.

Figure 1:
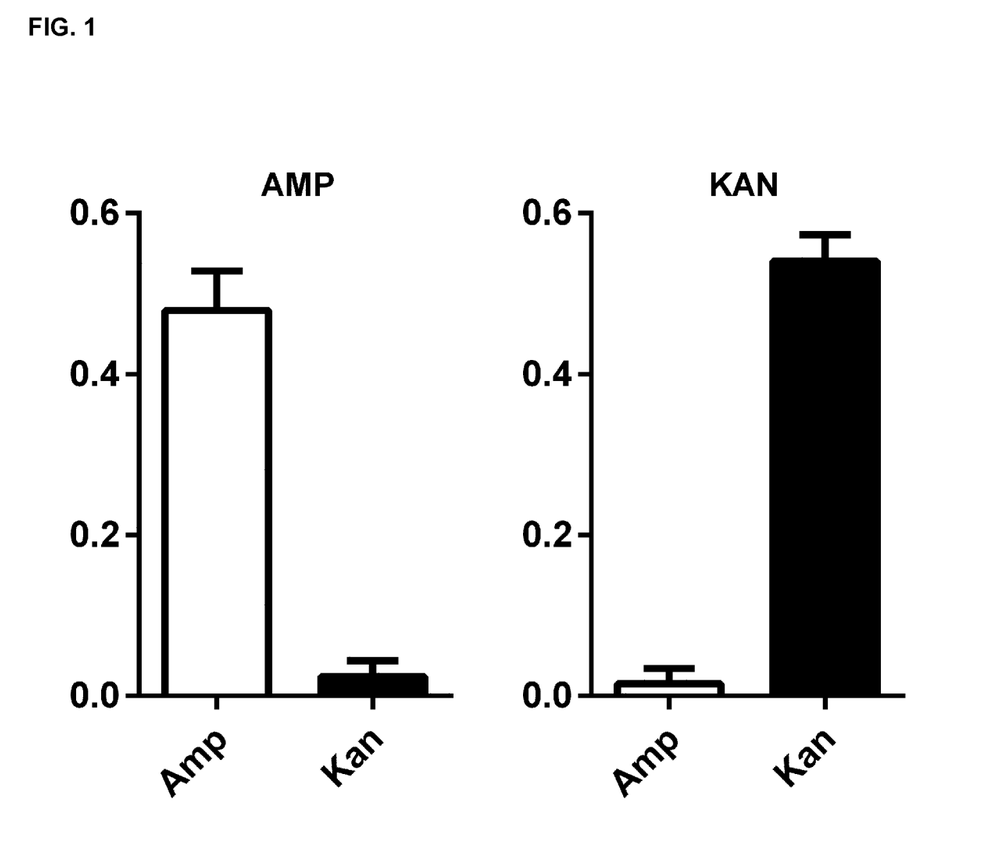
FIG. 1: Detection of specific transcripts after immunoprecipitation. Both immunoprecipitates (Amp and Kan in X-axis) were tested with Ampicillin and Kanamycin primers to identify the presence or absence of the antibiotic resistant genes. X-axis is treatment type (ampicillin—Amp- or kanamycin—Kan-) and Y-axis is normalized Log ratio. The experiment was performed using two technical replicates and five biological replicates (standard error mean SEM). 10 ng RNA was loaded per sample. Samples were considered below the limit of detection if copy number (CN) was lower than the lowest standard. *$p<0.05$. See working Example 1 herein for further details.

The working examples herein provided demonstrate the advantages of the method. In short, working examples herein demonstrate among other issues the following:

Example 1 and FIG. 1 demonstrate that the method of the invention is able to selectively detect the antibiotic resistance of E. coli bacterial cultures transformed with plasmids conferring resistance to the antibiotic ampicillin (AmpR positive) or kanamycin (KanR positive), respectively. Using the method of the invention and an antibody against bacterial ribosome subunits, it was possible to specifically identify enriched antibiotic resistance genes in transformed E. coli cultures.

Figure 2:
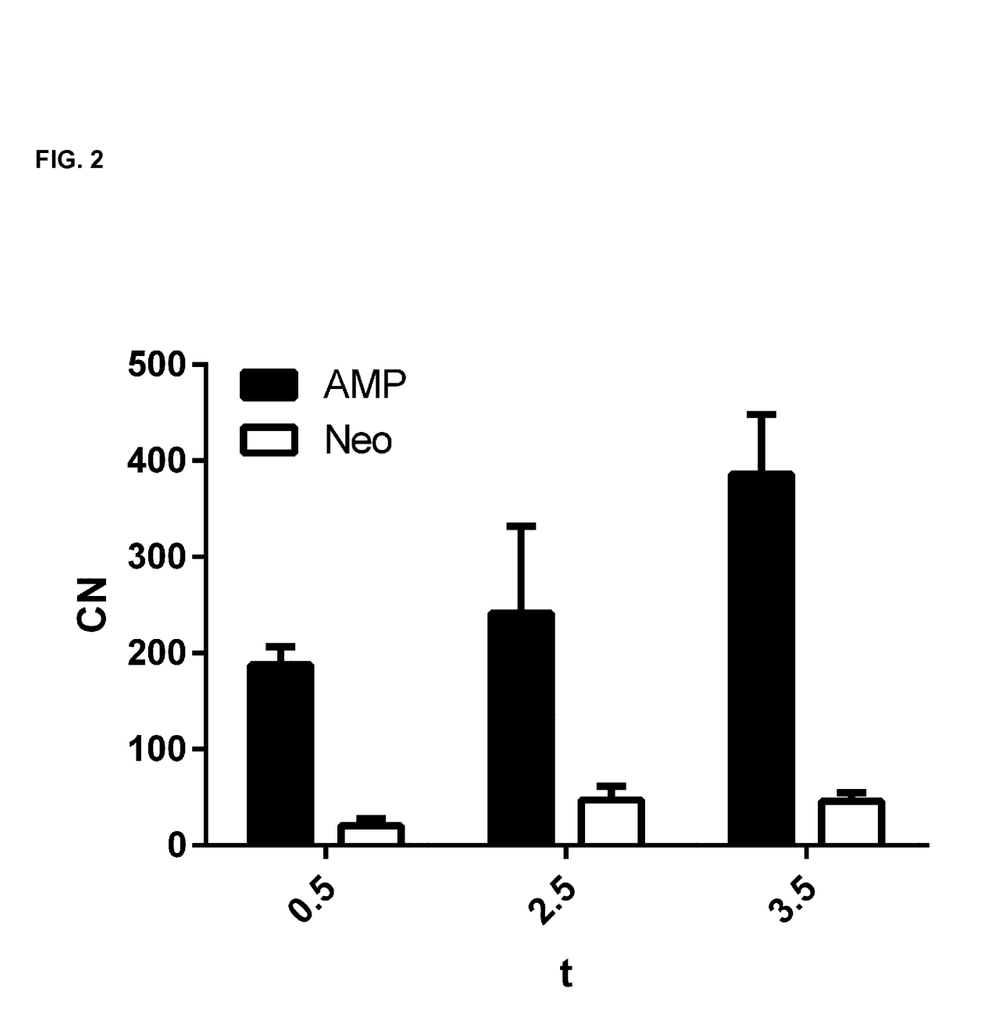
FIG. 2: Selective increase in ampR expression in Ampicillin-transformed *E. coli* culture. X-axis is Time Point (t) and Y-axis is Copy Number (CN). t1: 0.5 h, t2: 2.5 h. t3: 3.5 h. *$p<0.05$ vs. Neomycin. See working Example 2 herein for further details.

Example 2 and FIG. 2 demonstrate that the method allows to discriminate increases in actively vs. not actively translated genes in the presence of different antibiotic resistance genes. E. coli cultures were transformed with a plasmid containing resistance cassettes for two antibiotics (Ampicillin and Neomycin) while applying selective pressure just for Ampicillin. Thus, with this approach, the selective increase in the expression of ampR gene (especially during exponential growth) could be detected, while neoR was mostly unaffected, underscoring the ability of this method to provide a higher detection range for transcriptionally active genes.

Figure 3:
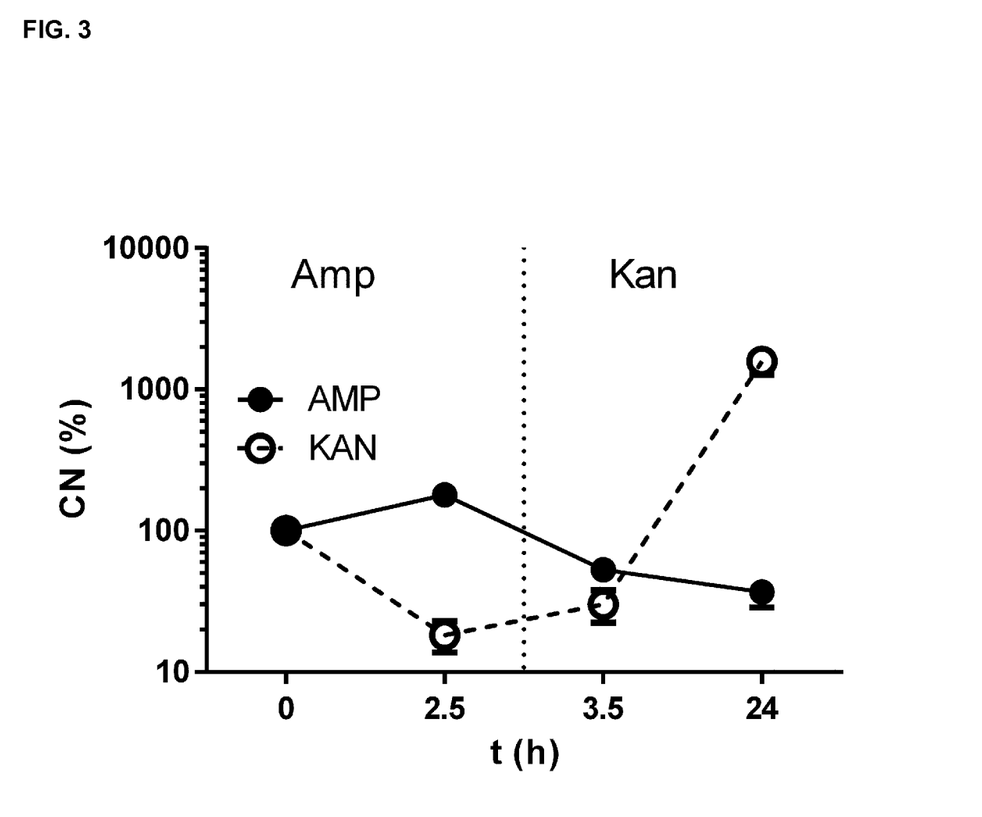
FIG. 3: Antibiotic-induced dynamic alterations in gene expression in mixed *E. coli* cultures *$p<0.05$ vs. Kanamycin. X-axis is Time Point (t) at 0 h, 2.5 h, 3.5 h and 24 h, and Y-axis is Copy Number (CN %). See working Example 3 herein for further details.

One step further, Example 3 and FIG. 3 show that the method is able to monitor antibiotic-induced dynamic expression changes not only in a sample with a single bacteria species, but in mixed cultures, thus mimicking a real clinical sample.

Therefore, it is demonstrated that a selective immunoprecipitation of fully-assembled bacterial ribosomes and the isolation of ribosome-associated transcripts is useful as a fast and dynamic method to assess AMR in a wide range of genetically defined bacterial cultures.

It is herein demonstrated that the direct detection of AMR-related genes, which are highly expressed in resistant populations therefore presenting higher RNA amounts, can be effectively used to determined AMR in a simple and direct way. Thus, as an advantageous point, the method provides increased sensitivity compared to DNA-based methods since as explained above, these other methods do not allow to distinguish between viable and non-viable cells. Further, DNA levels provide a poor representation of the metabolic or physiological state of the cell, which would hinder close monitoring of the bacterial response to antibiotic treatment.

The method of the invention is able to assess changes in the expression pattern of resistance genes in a fast and accurate manner. RNA levels are a close correlate of the bacterial metabolic status, with a 40-fold RNA:DNA ratios in exponential growth phases. The increase in abundance of RNA makes increasing test sensibility and at the same time, the increased lability and degradation rate of RNA, reduces the chance of detection of RNA in non-viable cells.

As another advantageous point, downstream application of the sample (such as hybridization or qRT-PCR) is very simple, thus avoiding lengthy processing of the sample, as required for sequencing. In this regard, the method of the invention can be coupled to currently available RNA-chip-based methods, thus, allowing for the fast detection of transcripts in under 20 minutes, provided that sufficient starting material is available.

Furthermore, given the fact that the entire procedure can be performed in just a few hours, it provides a fast answer, in stark contrast to other methods such as bacterial cultures. This fast-processing allows for a more dynamic monitoring of the progression of the disease and the bacterial response to treatment, reaching (almost) real-time monitoring.

Advantageously, it is not needed to know the bacteria species which are contained in the sample before applying the method. The method of the invention is able to determine the antibiotic resistance of the sample, regardless of the bacterium or mix of bacteria contained in the sample, thus being faster and direct to the problem as compared to other methods. As said before, other methods require prior culture of the sample and the identification of the pathogen responsible of the infection, which is very time-consuming and does not provide information of the AMR.

The method according to the invention enables quick identification of antibiotic resistance directly from a sample without culturing the pathogen and without amplification. Moreover, using this method the presence of resistance towards an antibiotic of choice can be easily detected or excluded. The assays are designed to reduce handling and turnaround time to enable screening programs such as the screening of all incoming patients for e.g. MRSA or/and ORSA.

By fast detection of the antibiotic resistance profile of microorganisms in a clinical sample, a specific therapy can be initiated at an early stage of infection. Fast identification and characterization of antibiotic resistance could lead to early isolation of patients, thus leading to a reduction of antibiotic resistances in infections. Furthermore, the fast detection of antibiotic resistances in a patient's sample can lead to selection of a specific antibiotic suspected to be active in this patient, resulting in a reduced use of expensive broad-spectrum antibiotics.

Without being bound to the theory, it is believed that this is the first time that a comprehensive and real-time translational profile is obtained directly targeting antibiotic resistance genes from mixed bacterial cultures and without pre-identifying the bacteria responsible from the AMR. Some difficulties have had to be overcome. First, single-stranded RNA molecules such as mRNA are significantly less stable and labile than DNA. Second, bacterial mRNA species differ from their eukaryote counterparts, containing different regulatory and stabilization sequences, hindering a direct application of eukaryote-based approaches. Further, genes responsible of drug resistance can be as constitutive genes or contained in plasmids. Furthermore, bacterial ribosome protein accessibility to antibodies in an intact ribosome-mRNA ensemble was not characterized.

Thus, based on the knowledge of the prior art, the skilled person could not have foreseen with a reasonable expectation of success that the herein described methods would work with the significant experimental effects as shown in the Examples and overcoming the above-mentioned drawbacks.

Throughout the description and claims the word "comprise" and its variations such as "comprising" are not intended to exclude other technical features, additives, components, or steps. Additional objects, advantages and features of the invention will become apparent to those skilled in the art upon examination of the description or may be learned by practice of the invention. Furthermore, the present invention covers all possible combinations of particular and preferred embodiments described herein. The following examples and drawings are provided herein for illustrative purposes, and without intending to be limiting to the present invention.

DETAILED DESCRIPTION OF THE INVENTION

Method for Determining the Resistance of a Microorganism to a Drug by Detecting at Least a Transcript of a Drug Resistance Gene from a Microorganism in a Biological Sample "Microorganism" includes bacteria, yeasts, molds and eukaryotic parasites. In a particular embodiment, the microorganism is a bacterium. Bacteria is generally classified in Gram-positive and Gram-negative bacteria. Gram staining classification separates bacteria depending on their cell wall components. The Gram staining is almost always the first step in the preliminary identification of a bacterial organism. While Gram staining is a valuable diagnostic tool in both clinical and research settings, not all bacteria can be definitively classified by this technique. This gives rise to gram-variable and gram-indeterminate groups. Thus, the term bacteria also include in this context, gram-variable and gram-indeterminate groups. Particularly, the Gram-positive microorganism is selected from the group consisting of *Staphylococcus*, *Enterococcus*, *Streptococcus* and *Clostridium*. The Gram-negative microorganism may be selected from Enterobacteriaceae. The Gram-negative microorganism from the group of Enterobacteriaceae may be selected from *Escherichia coli*, *Klebsiella* spp., *Proteus* spp., *Salmonella* spp., *Enterobacter* spp. and *Serratia marcescens*. The Gram-negative microorganism may also be selected from *Pseudomonas aeruginosa*, *Acinetobacter* spp., *Burkholderia* spp., *Stenotrophomonas* and *Haemophilus influenzae*.

More particularly, the microorganism is selected from the group consisting of Methicillin resistant *Staphylococcus*, Oxacillin resistant *Staphylococcus*, Vancomycin resistant *Staphylococcus*, Vancomycin resistant *Enterococcus*, Vancomycin resistant *Clostridium* and high-level Aminoglycoside resistant Enterococci.

The microorganism is even more particularly selected from the group consisting of *Staphylococcus aureus*, Methicillin Resistant *Staphylococcus aureus* (MRSA), Oxacillin Resistant *Staphylococcus aureus* (ORSA), Vancomycin Resistant *Staphylococcus aureus* (VRSA), Vancomycin Resistant *Staphylococcus* (VRS), Vancomycin Resistant Enterococci (VRE), *Streptococcus pneumoniae*, drug resistant *Streptococcus pneumoniae* (DRSP), and Aminoglycoside resistant Enterococci (HLAR), Vancomycin resistant *Clostridium difficile* (VRCD).

In a particular embodiment, the microorganism is one responsible of the most urgent clinical threats according to the (Center for Disease Control and Prevention, CDC from USA), i.e. *Clostridium difficile* (CDIFF), Carbapenem-Resistant Enterobacteriaceae (CRE), and *Neisseria gonorrhoeae*.

In another particular embodiment, the microorganism is one responsible of the most serious threats according to CDC, i.e. Multidrug-resistant *Acinetobacter*, Drug-Resistant *Campylobacter*, Extended Spectrum Enterobacteriaceae (ESBL), Multidrug-Resistant *Pseudomonas Aeruginosa*, Drug-Resistant Non-Typhoidal *Salmonella*, Drug-Resistant *Salmonella* serotype *Typhi*, Drug-Resistant *Shigella*, Multidrug-resistant Tuberculosis.

In another particular embodiment, the microorganism belongs to *Enterobacter* spp. as e.g. *Enterobacter cloacae*, *Enterobacter gallinarum* and *Enterobacter faecalis*, all related to gastrointestinal and urinary infections usually of nosocomial origin.

The term "drug" is understood in this context as any medicament which acts against a microorganism, which is commonly known as an antimicrobial or antibiotic. "Antimicrobial" is a general category of compounds that kills microbes (bacteria, fungi, and other pathogens). The term "antimicrobial" has in the present invention the normal meaning in the field, namely, an agent that kills microorganisms or inhibits their growth. They can be further grouped according to the microorganisms they act primarily against, e.g. against bacteria (antibacterials) and against fungi (antifungals). The term also includes "antiseptics", which are mainly used to deter bacterial growth. In general, they are used to clean the skin before an injection (like during a blood test) and can be used to clean wounds. Normally, antiseptics weaken and slow the growth of bacteria and other microorganisms, which in turn helps to prevent the bacteria from causing further infection. Antibiotics, are responsible for killing bacteria as well as some types of fungi and parasites. Antiseptics are generally distinguished from antibiotics because antibiotics are generally transported through the lymphatic system to destroy bacteria within the body, and from disinfectants, which destroy microorganisms found on non-living objects.

Thus, in a particular embodiment, the method is useful for determining the resistance of a microorganism to an antimicrobial; and more particularly, to an antibiotic. Thus, in a particular embodiment, the microorganism is a bacterium, the drug is an antibiotic and the antibody or a fragment thereof binds specifically to a bacterial-ribosomal protein.

Step (i) of the method: submitting the sample to a chemical or a mechanical cell lysis method, thereby obtaining a lysate and cell debris Chemical methods include e.g. incubation of the sample with a lysis buffer. Thus, in a particular embodiment, the sample is incubated with a lysis buffer ensuring ribosomal and RNA integrity. Particularly, the lysis buffer comprises RNAse inhibitors to ensure ribosomal and RNA integrity. This can be alternatively achieved by selecting magnesium (e.g. 10 mM) or heparin concentrations (e.g. up to 100 µg/ml).

In a particular embodiment, the lysis buffer is composed of 100 mM K+glutamate, 20 mM HEPES-Tris (pH 7.5), 0.1 mM EDTA, 6.1 mM MgOAc, 14 mM b-mercaptoethanol, 0.05% Tween 20, 10 U/ml DNAse I, 0.05 mM $CaCl_2$, 0.1 mg/ml lysozyme, RNAse inhibitors (10 U/ul).

In a particular embodiment, the sample is lysed by a mechanical method. Mechanical methods include bead homogenization of the sample with e.g. steel or ceramic or zirconium silicate beads. An alternative mechanical method is sonication. In a particular embodiment, a stabilizing buffer is added to the sample before submitting the sample to the mechanical method. The stabilizing buffer is one that ensuring ribosomal and RNA integrity.

In a particular embodiment, the sample is submitted to a chemical lysis method followed by a mechanical method. More particularly, the sample is incubated with lysis buffer for some time and it is further lysed by mechanical-bead-based shearing.

Biological Sample

In a particular embodiment, the biological sample is a human sample. In a more particular embodiment, the human sample is any bodily fluid. Particularly, the human sample is selected from the group consisting of blood, plasma, serum, saliva, urine and an abscess.

Pretreatment of the Sample

In a particular embodiment, prior to step (i), a step of pretreatment of the initial biological sample is performed, and this step comprises concentrating the sample in case the initial sample is a fluid. In a particular embodiment, concentration of the sample is made by centrifugation.

Step (ii) of the method: obtaining a ribosome-antibody complex from the lysate using an antibody or a fragment thereof which binds specifically to a microorganism-ribosomal protein In a particular embodiment, the step (ii) of obtaining the ribosome-antibody complex is performed with one of the following procedures:
(a) first incubating the lysate with the antibody or a fragment thereof, to obtain the ribosome-antibody complex, and subsequently isolating the ribosome-antibody complex by an affinity purification method;
(b) first isolating the ribosomes from the lysate, subsequently incubating the resulting ribosomes preparation with the antibody or the fragment thereof, to obtain the ribosome-antibody complex and subsequently isolating the ribosome-antibody complex by an affinity purification method; and
(c) first incubating the antibody or the fragment thereof with means for affinity-purifying the antibody or the fragment thereof, and subsequently incubating the lysate with the aforementioned mixture of the antibody or the fragment thereof and the means for affinity purifying the antibody or the fragment thereof.

In a more particular embodiment, step (ii) of obtaining a ribosome-antibody complex from the lysate is performed following procedure (a) wherein the lysate is first incubated with the antibody or the fragment thereof, to obtain the ribosome-antibody complex, and subsequently, the ribosome-antibody complex is isolated by an affinity purification method.

In a particular embodiment, incubation is performed for at least 15 minutes, at a temperature between 4-37° C. More particularly, incubation is performed for 1 hour at 4° C. with rotation.

Appropriate affinity purification methods include e.g. magnetic immunoprecipitation, protein A-, G-, sepharose-L-agarose-based immunoprecipitation, and affinity column-based purification methods, where the antibody-ribosome complex is bound to the affinity method and purified by centrifugation, magnetic means or affinity-based entrapment.

In a particular embodiment, the affinity purification method comprises incubating the sample with magnetic beads coated with protein A/G. Particularly, the affinity purification method is magnetic immunoprecipitation which is performed adding magnetic beads to the lysate and incubating for at least 15 minutes at a temperature between 4-50° C., and more particularly, it is incubated one hour maintained at a temperature of 4° C. with rotation.

When procedure (b) is used, ribosomes are firstly isolated from the lysate and subsequently, the resulting ribosomes preparation is incubated with the antibody or the fragment thereof, to obtain the ribosome-antibody complex. In this case, ribosome isolation can be performed by a preparative method such as ultracentrifugation which can be combined with sucrose-based cushion or sucrose gradients to achieve separation of ribosomal monomers and polysomes based on density. Such methods are not affinity purification methods. The resulting ribosomes preparation is incubated with the antibody or the fragment thereof, to obtain the ribosome-antibody complex. Subsequently, the ribosome-antibody complex is isolated by an affinity purification method.

In a particular embodiment, between steps (i) and (ii), a step of isolating the lysate obtained from step (i) is performed and therefore, the resulting isolated lysate is processed according to step (ii). Particularly, isolation of the lysate is performed by high-speed centrifugation.

Antibody or a Fragment Thereof

In a particular embodiment, the antibody or the fragment thereof binds to a bacterial ribosomal subunit selected from the group consisting of L9, L16, L17, L19, L20, L21, L25, L27, L28, L31, L32, L33, L34, L35, L36, S1, S6, S16, S18, S20, S21, S22, and S31.

The inventors have found by bioinformatics determination, putative conserved ribosomal sequences among bacteria, which are useful to design the antibody or the fragment thereof. See Example 4. Accordingly, in a more particular embodiment, the antibody or the fragment thereof binds to a bacterial ribosomal subunit selected from the group consisting of S6, S16, S18 and S20. In a more particular embodiment, the antibody or the fragment thereof binds to an epitope of bacterial ribosomal subunit with a sequence selected from the group consisting of SEQ ID NO: 1 to 7.

In a more particular embodiment, the antibody or the fragment thereof binds to the bacterial ribosomal subunit S16, which is far enough from mRNA binding sites, tRNAs and translation factors and has good surface accessibility. Particularly, the antibody or the fragment thereof binds to an epitope with sequence selected from the group consisting of SEQ ID NO: 2 to 4, and more particularly to SEQ ID NO: 3.

The antibody may be generated using methods well known in the art. Such antibodies may include, but are not limited to, polyclonal, monoclonal, and chimeric single chain antibodies.

The antibody fragment may be generated using methods well known in the art. For example, such antibody fragments include, but are not limited to, the F(ab')2 fragments which can be produced by pepsin digestion of the antibody molecule and the Fab fragments which can be generated by reducing the disulfide bridges of F(ab')2 fragments. Alternatively, Fab expression libraries may be constructed to allow rapid and easy identification of monoclonal Fab fragments with the desired specificity.

Step (iii) of the method: purifying the mRNA associated to the ribosome-antibody complex by means of a nucleic acid extraction method The skilled person can select available methods and kits for nucleic acid extraction. After extraction, RNA is quantified and optionally, RNA quality is assessed for example using denaturing formaldehyde gels followed by ethidium bromide staining.

Step (iv) of the method: submitting the resulting mRNA to a specific gene detection method, thereby identifying the at least one drug resistance gene transcript of the biological sample.

A "specific" gene detection method is one that is able to identify particular genes. In a particular embodiment, the specific gene detection method used in downstream analysis (step (iv)) is an amplification-based method, a sequencing-based or a hybridization-based method.

In a more particular embodiment, the specific gene detection method is selected from the group consisting of qRT-PCR, RNA-RNA hybridization, RNA-DNA hybridization, and Next Generation Nucleic acid sequencing. More particularly, in a clinical/hospital setting, the specific gene detection method is RNA-DNA hybridization, using nucleic acid sequences (probes) which hybridize the at least one drug resistance gene transcript.

Next-generation sequencing (NGS), also known as high-throughput sequencing, massively parallel or deep sequencing, is the catch-all term used to describe a number of different modern sequencing technologies including Illumina (Solexa)™ sequencing, Roche 454™ sequencing, Ion torrent: Proton/PGM™ sequencing and SOLiD™ sequencing. These recent technologies allow to sequence DNA and RNA much more quickly and cheaply than the previously used Sanger sequencing, and as such have revolutionized the study of genomics and molecular biology.

In a particular embodiment, more than one transcript of a drug resistance gene from a bacterium or different bacteria are detected in the same biological sample, the specific gene detection method is a hybridization-based method and a nucleic acid-chip is used with multiple nucleic acid sequences (probes) which simultaneously hybridize different drug resistance gene transcripts from one sample.

Antibiotic Resistance Genes

In a particular embodiment, the drug resistance gene transcript is selected from the group consisting of Ampicillin resistance gene, Kanamycin resistance gene, Neomycin resistance gene, puromycin resistance gene, and chloramphenicol resistance gene.

Particularly, the antibiotic is selected from the group consisting of aminoglycosides, carbacephems, carbapenems, cephalosporins, glycopeptides, macrolides, monobactams, penicillins, beta-lactam antibiotics, quinolones, bacitracin, sulfonamides, tetracyclines, streptogramines, chloramphenicol, clindamycin, oxazolidinones, ansamycins, glycopeptides, lipopeptides and lincosamide.

More particularly, the antibiotics are selected from beta-lactam antibiotics, macrolides, lincosamide, and streptogramins. The antibiotic may also be selected from beta-lactam antibiotics. In particular the antibiotic may be selected from penicillins. In the present invention, beta-lactam antibiotics in particular include carbapenems, cephalosporins, monobactams, and penicillines.

Even more particularly, the antibiotic is selected from the group consisting of Amikacin, Gentamicin, Kanamycin, Neomycin, Netilmicin, Streptomycin, Tobramycin, Loracarbef, Ertapenem, Imipenem, Cilastatin, Meropenem, Cefadroxil, Cefazolin, Cephalexin, Cefaclor, Cefamandole, Cefoxitin, Cefprozil, Cefuroxime, Cefixime, Cefdinir, Cefditoren, Cefoperazone, Cefotaxime, Cefpodoxime, Ceftazidime, Ceftibuten, Ceftizoxime, Ceftriaxone, Cefsulodine, Cefepime, Teicoplanin, Vancomycin, Azithromycin, Clarithromycin, Dirithromycin, Erythromycin, Roxithromycin, Troleandomycin, Aztreonam, Amoxicillin, Ampicillin, Azlocillin, Carbenicillin, Cloxacillin, Dicloxacillin, Flucloxacillin, Mezlocillin, Nafcillin, Penicillin, Piperacillin, Ticarcillin, Bacitracin, Colistin, Polymyxin B, Ciprofloxacin, Enoxacin, Gatifloxacin, Levofloxacin, Lomefloxacin, Moxifloxacin, Norfloxacin, Ofloxacin, Trovafloxacin, Mafenide, Prontosil, Sulfacetamide, Sulfamethizole, Sulfanilimide, Sulfasalazine, Sulfisoxazole, Trimethoprim, Trimethoprim sulfa, Sulfamethoxazole, Co-trimoxazole, Demeclocycline, Doxycycline, Minocycline, Oxytetracycline, Tetracycline, Chloramphenicol, Clindamycin, Ethambutol, Fosfomycin, Furazolidone, Isoniazid, Linezolid, Metronidazole, Mupirocin, Nitrofurantoin, Platensimycin, Pyrazinamide, Quinupristin/Dalfopristin, Rifampin, Spectinomycin, Amphotericin B, Flucanazole, Fluoropyrimidins, Gentamycin, Methicillin, Oxacillin and clavulanic acid.

More particularly, the antibiotic is selected from Vancomycin, Methicillin, Oxacillin, Clindamycin, Trimethoprim, Trimethoprim sulfa, Gentamycin, and clavulanic acid.

Method Further Allowing the Identification of the Microorganism

In a particular embodiment, further to determining the resistance of a microorganism to a drug, the microorganism or microorganisms present in the biological samples are identified. This is performed by submitting the same resulting mRNA from step (iii) to a specific gene detection method, thereby identifying unique genes, variants or sequences for such microorganism. Thus, the identification of the microorganism can be performed in parallel to step (iv), using the same specific gene detection method but adding means to specifically identify unique genes, variants or sequences for such microorganism. For example, nucleic acid sequences (probes) for unique genes, variants or sequences for such microorganism can be added to the chip which already include nucleic acid sequences which hybridize the drug resistance gene transcript.

Kit for Detecting at Least a Transcript of a Drug Resistance Gene from a Bacterium in a Biological Sample As said before, another aspect of the invention relates to the use of a kit for detecting at least a transcript of a drug resistance gene from a bacterium in a biological sample using the methods described above, the kit comprising: (i) an antibody or a fragment thereof which binds specifically to a microorganism-ribosomal protein; and (ii) means for isolating a ribosome-antibody complex.

In another aspect, the invention relates to the use of a kit for detecting at least a transcript of a drug resistance gene from a microorganism in a biological sample following the method described in the first aspect, the kit comprising: (i) an antibody or a fragment thereof which binds specifically to a microorganism-ribosomal protein; and (ii) means for isolating a ribosome-antibody complex.

In another aspect, the invention relates to a kit for detecting at least a transcript of a drug resistance gene from a bacterium in a biological sample using the methods described above, the kit comprising: (i) an antibody or a fragment thereof which binds specifically to a bacterial-ribosomal protein subunit selected from the group consisting of S6, S16, S18 and S20, more particularly to S16; and (ii) means for isolating a ribosome-antibody complex. Particularly, the antibody or the fragment thereof binds to an epitope with sequence selected from the group consisting of SEQ ID NO: 2 to 4, and more particularly to SEQ ID NO: 3.

Additionally, the kit can comprise a lysis buffer ensuring ribosomal and RNA integrity and/or means for lysing the cells by means of chemical or mechanical methods.

The step of purifying the mRNA associated to the ribosome-antibody complex using a nucleic acid extraction method and the step of downstream analysis of the mRNA by a specific gene detection method can be performed with commercially available kits. However, in a particular embodiment, means for purifying the mRNA associated to the ribosome-antibody complex are additionally provided in the kit of the invention. In another particular embodiment, means for specific gene detection are additionally provided in the kit of the invention.

EXAMPLES

Example 1: Selective Detection of Antibiotic Resistance in Transformed Bacterial Cultures To assess the efficiency of bacterial ribosome-associated transcripts immunoprecipitation, a genetically-controlled setting was performed using *Escherichia coli* cultures transformed with plasmids conferring resistance to the antibiotic ampicillin (AmpR positive) or kanamycin (KanR positive), respectively. Ribosomal immunoprecipitates were tested with Ampicillin and Kanamycin primers to identify the presence or absence of the antibiotic resistant genes. The experiment was performed using two technical replicates and five biological replicates (standard error mean SEM).

By means of ribosomal immunoprecipitation using an antibody against bacterial ribosome subunits, it was possible to specifically identify enriched antibiotic resistance genes in transformed *E. coli* cultures by qRT-PCR (see FIG. 1).

Example 2: Selective Increase in AmpR Expression in Ampicillin-Transformed *E. coli* Culture To assess if the method would allow to discriminate increases in actively vs. not actively translated genes, *E. coli* cultures were transformed with a plasmid containing resistance cassettes for two antibiotics (Ampicillin and Neomycin) while applying selective pressure just for Ampicillin.

With this approach, we could detect the selective increase in the expression of ampR gene (especially during exponential growth), while neoR was mostly unaffected (see FIG. 2), underscoring the ability of this method to provide a higher detection range for transcriptionally active genes.

Example 3: Monitoring of Antibiotic-Induced Dynamic Expression Changes in Mixed Cultures To test the ability of the method to determine dynamic changes in selective pressure and transcriptional status we used a mixed *E. coli* culture containing both Kanamycin resistant- and Ampicillin resistant-cells and by subjecting it to different antibiotic pressures (Ampicillin for 2.5 h and then switching to Kanamycin for up to 24 h). Subsequent qRT-PCR result for ampR or kanR genes allowed us to closely monitor the associated changes in gene expression of these AMR genes in the recovered immunoprecipitated transcripts (see FIG. 3), underscoring the diagnostic potential of this approach.

Example 4: Bioinformatics Determination of Putative Conserved Ribosomal Sequences Sequence homology in ribosomal proteins is highly variable. Hence, we decided to perform bioinformatics analyses on conserved ribosomal proteins to assess their suitability as targets for antibody design. First, subunits were visually screened for antibody binding accessibility using PDB crystallographic structures. Subsequently, Gblocks was used to identify conserved blocks of protein sequence throughout a range of different bacteria by multiple alignments. This approach identified S6, S16, S18 and S20 as highly conserved and antibody-accessible subunits. The multiple alignments of our 4 ribosomal proteins of interest identified the position and number of conserved regions per protein (see Table 1).

TABLE 1

Highly conserved amino acid regions in selected bacterial ribosomal proteins

| Ribosomal Subunit | # Conserved regions | Amino acid positions | Surface Accessibility | Sequence |
|---|---|---|---|---|
| S6 | 1* | 42-50 | ▫ | G-R-LAY-I (SEQ ID NO: 1) |
| S16 | 3 | 3-27 | X | SIRL-R-KKRPFRIVVADSR--RD (SEQ ID NO: 2) |
|  |  | 29-40 | ▫ | GRFIE--G-YNP (SEQ ID NO: 3) |
|  |  | 59-70 | ▫ | WL--GAQPSD-V (SEQ ID NO: 4) |

TABLE 1-continued

Highly conserved amino acid regions in
selected bacterial ribosomal proteins

| Ribosomal Subunit | # Conserved regions | Amino acid positions | Surface Accessibility | Sequence |
|---|---|---|---|---|
| S18 | 1 | 22-67 | ☐ | KD---LK-FI-ERGKI-PRRI TGT-AK-QR-LA-AIKRAR-LALL (SEQ ID NO: 5) |
| S20 | 2* | 1-30 | X | N-KSA-KR----EK-R--N---- S--RTFIK (SEQ ID NO: 6) |
|  |  | 35-50 | ☐ | KG-IHKNKAAR-KSRL (SEQ ID NO: 7) |

*Gblocks less stringent parameter for conserved block discovery

Example 5: Methods Used in Examples 1-3

Bacteria and Growth Conditions

Bacteria are grown in liquid broth and temperature and at 37° C., supplemented with either Ampicillin (100 µg/ml) or Kanamycin (50 µg/ml).

Ribosome-Associated Transcript Isolation

Bacterial cells were lysed with a specific buffer to preserve the integrity of the ribosome-mRNA complex supplemented with RNAse inhibitors. The lysis buffer is composed of 100 mM K+glutamate, 20 mM HEPES-Tris (pH 7.5), 0.1 mM EDTA, 6.1 mM MgOAc, 14 mM b-mercaptoethanol, 0.05% Tween 20, 10 U/ml DNAse I, 0.05 mM $CaCl_2$), 0.1 mg/ml lysozyme, RNAse inhibitors (10 U/ul). Pellets were resuspended at room temperature for 1 minute in 100 µL lysis buffer. Lysis buffer volume was adjusted to 700 µL and cells were further lysed by mechanical bead-based shearing.

The ribosome-mRNA bound complexes were concentrated by immunoprecipitation. The ribosome-mRNA complex is rather stable and remains intact until RNA is eluted. The bacterial lysate was incubated with a primary monoclonal antibody concentrate specific to prokaryotic ribosome subunit 13 E. coli (final antibody concentration 2.5 µg/µL 193E11E5B11, DSHB UIOWA—from Developmental Studies Hybridoma Bank (DSHB) at the University of Iowa-) for 1 hour with shaking at 4° C.

Next, the lysate was incubated with magnetic beads coated with protein A/G (20 µL 88802, Thermo Scientific) to preferentially bind the antibody-ribosome complex and allow for subsequent washing steps. Magnetic beads/antibody-ribosome complex were washed three times with lysate buffer (400 µL, prepared without reducing agent) in preparation for primary-secondary antibody incubation. AG secondary antibody were added to the immunoprecipitates (IPs) and incubated overnight with shaking at 4° C. A magnet held the captured ribosome-mRNA complexes in place while molecules with nonspecific binding were washed away. Following three washing steps, the ribosome-mRNA complex was isolated and prepared for RNA extraction.

Total RNA was prepared according to manufacturer's instructions using an RNeasy Microkit (Qiagen) and quantified with a NanoDrop 1,000 spectrophotometer (Thermo Scientific) and the RiboGreen RNA quantitation kit (Molecular Probes).

qRT-PCR Determination of Antibiotic Resistance Genes

Single-step qRT-PCR was performed as follows: Equal amounts of RNA were assayed using the Brilliant II SYBR Green qRT-PCR 1-Step Master Mix (Agilent Technologies). Amplification efficiencies were calculated using MxPro software (Stratagene) and were within accepted parameters (80-120%).

Primers for ampR, kanR or neoR cassettes were designed using Primer3Plus (ThermoScientific) using available genome and sequence information were as follows:

```
Kanamycin FOR
                                    (SEQ ID NO: 8)
    5'-TGCCTGCTTGCCGAATATCA-3'

Kanamycin REV
                                    (SEQ ID NO: 9)
    5'-ATATCACGGGTAGCCAACGC-3'

Ampicillin FOR
                                    (SEQ ID NO: 10)
    5'-AGTGATAACACTGCGGCCAA-3'

Ampicillin REV
                                    (SEQ ID NO: 11)
    5'-TTCATTCAGCTCCGGTTCCC-3'

Neomycin FOR
                                    (SEQ ID NO: 12)
    5'-TGAATGAACTGCAGGACGAG-3'

Neomycin REV
                                    (SEQ ID NO: 13)
    5'-AATAGCAGCCAGTCCCTTCC-3'
```

Statistical Analysis

Graphpad Prism software or R-based statistical tests were used for all tests. T-test or two-way ANOVA tests were used depending on experimental design. $p<0.05$ was considered as significant. All results are shown as SEM±SEM.

REFERENCES

Patent Literature

WO2014/072349A1
US2015/141274A1

Non-Patent Literature

Bursle, E. & Robson, "Non-culture methods for detecting infection" *J. Aust Prescr* 39, 171-175, (2016)

Bosshard, P. P., Abels, S., Zbinden, R., Bottger, E. C. & Altwegg, M. "Ribosomal DNA Sequencing for Identification of Aerobic Gram-Positive Rods in the Clinical Laboratory (an 18-Month Evaluation)" *J. Clin. Microbiol.* 41, 4134-4140, (2003)

Rampini, S. K. et al. "Broad-range 16S rRNA gene polymerase chain reaction for diagnosis of culture-negative bacterial infections" *Clin. Infect. Dis.* 53, 1245-1251, (2011)

Otto, M., "Next-generation sequencing to monitor the spread of antimicrobial resistance", *Genome Med.* 9, 68, (2017)

Cangelosi, G. A. & Meschke, J. S. "Dead or Alive: Molecular Assessment of Microbial Viability" *Appl. Environ. Microbiol.* 80, 5884-5891, (2014)

Milner, M. G., Saunders, J. R. & McCarthy, A. J. "Relationship between nucleic acid ratios and growth in *Listeria monocytogenes*" *Microbiology* 147, 2689-2696, (2001)

The invention claimed is:

1. A method for determining the resistance of at least one microorganism to a drug by detecting at least a transcript of a drug resistance gene from at least one microorganism in a biological sample, the method comprising the steps of:
   (i) submitting the sample to a chemical or a mechanical cell lysis method, thereby obtaining a lysate and cell debris;
   (ii) obtaining a ribosome-antibody complex from the lysate using an antibody or a fragment thereof which binds specifically to a microorganism-ribosomal protein;
   (iii) purifying the mRNA associated to the ribosome-antibody complex by means of a nucleic acid extraction method; and
   (iv) submitting the resulting mRNA to a specific gene detection method, thereby identifying the at least one drug resistance gene transcript of the biological sample.

2. The method according to claim 1, wherein the step (ii) of obtaining the ribosome-antibody complex is performed with one of the following procedures:
   (a) first incubating the lysate with the antibody or a fragment thereof, to obtain the ribosome-antibody complex, and subsequently isolating the ribosome-antibody complex by an affinity purification method;
   (b) first isolating the ribosomes from the lysate, subsequently incubating the resulting ribosomes preparation with the antibody or the fragment thereof, to obtain the ribosome-antibody complex, and subsequently isolating the ribosome-antibody complex by an affinity purification method; and
   (c) first incubating the antibody or the fragment thereof with means for affinity-purifying the antibody or the fragment thereof, and subsequently incubating the lysate with the aforementioned mixture of the antibody or the fragment thereof and the means for affinity purifying the antibody or the fragment thereof.

3. The method according to claim 1, wherein one or more of the at least one microorganisms is a bacterium, the drug is an antibiotic and the antibody or a fragment thereof binds specifically to a bacterial-ribosomal protein.

4. The method according to claim 1, wherein the biological sample is a human sample.

5. The method according to claim 4, wherein the human sample is selected from the group consisting of blood, plasma, serum, saliva, urine and an abscess.

6. The method according to claim 1, wherein the antibody or the fragment thereof binds to a bacterial ribosomal subunit selected from the group consisting of L9, L16, L17, L19, L20, L21, L25, L27, L28, L31, L32, L33, L34, L35, L36, S1, S6, S16, S18, S20, S21, S22, and S31.

7. The method according to claim 6, wherein the antibody or the fragment thereof binds to a bacterial ribosomal subunit selected from the group consisting of S6, S16, S18 and S20.

8. The method according to claim 1, wherein between steps (i) and (ii), a step of isolating the lysate from the cell debris obtained from step (i) is performed and therefore, the resulting isolated lysate is processed according to step (ii).

9. The method according to claim 1, wherein the nucleic acid extraction method is selected from the group consisting of magnetic immunoprecipitation, protein A-, G-, sepharose-, L-agarose-based immunoprecipitation, and affinity column-based purification method.

10. The method according to claim 1, wherein the specific gene detection method of step (vi) is an amplification-based method, a sequencing-based method, or a hybridization-based method.

11. The method according to claim 10, wherein the specific gene detection method is selected from the group consisting of qRT-PCR, RNA-RNA hybridization, and RNA-DNA hybridization.

12. The method according to claim 10, wherein more than one transcript of a drug resistance gene from a bacterium or different bacteria are detected in the same biological sample, the specific gene detection method is a hybridization-based method and a nucleic acid-chip is used.

13. The method according to claim 1, wherein the drug resistance gene transcript is selected from the group consisting of ampicillin resistance gene, Kanamycin resistance gene, Neomycin resistance gene, puromycin resistance gene, and chloramphenicol resistance gene.

14. The method according to claim 1, wherein further to determining the resistance of at least one microorganism to a drug, the microorganism or microorganisms present in the biological sample is/are identified by submitting the same resulting mRNA from step (iii) to a specific gene detection method, thereby identifying genes, variants or sequences unique to a particular microorganism, thereby identifying the presence of one or more microorganisms in the sample.

\* \* \* \* \*